(12) United States Patent
Veasey

(10) Patent No.: US 6,765,672 B1
(45) Date of Patent: Jul. 20, 2004

(54) FAST OPTICAL STOKES POLARIMETER

(76) Inventor: David L. Veasey, 5336 Dunteachin Dr., Ellicott City, MD (US) 21043

( * ) Notice: Subject to any disclaimer, the term of this patent is extended or adjusted under 35 U.S.C. 154(b) by 231 days.

(21) Appl. No.: 09/947,147

(22) Filed: Sep. 5, 2001

Related U.S. Application Data

(60) Provisional application No. 60/230,683, filed on Sep. 7, 2000.

(51) Int. Cl.⁷ .................................................. G01J 4/00
(52) U.S. Cl. ...................................................... 356/367
(58) Field of Search .................................. 356/364–368

(56) References Cited

U.S. PATENT DOCUMENTS

| | | | | |
|---|---|---|---|---|
| 4,776,657 A | * | 10/1988 | Reeder ........................... | 385/3 |
| 5,062,153 A | * | 10/1991 | Turpin et al. ................ | 398/148 |
| 6,144,450 A | * | 11/2000 | Jopson et al. ................ | 356/364 |

\* cited by examiner

Primary Examiner—Alan Mathews
(74) Attorney, Agent, or Firm—Brett Alten (57) ABSTRACT

Methods and apparatus for optical Stokes polarimetry are provided. A polarimeter according to this invention includes a rotatable waveplate, including a variable birefringent material, and a polarizer optically downstream from the waveplate. The polarimeter can be integrated into a guided wave structure.

24 Claims, 8 Drawing Sheets

FAST OPTICAL STOKES POLARIMETER

CROSS-REFERENCE TO RELATED APPLICATIONS

This claims priority under 35 U.S.C. 119(e)(1) to U.S. Provisional Patent Application No. 60/230,683, filed Sep. 7, 2000, which is hereby incorporated by reference in its entirety.

FIELD OF THE INVENTION

The present invention relates to methods and apparatus for optical stokes polarimetry, and particularly to fast optical stokes polarimeters and integrated optical Stokes polarimeters.

BACKGROUND OF THE INVENTION

A rotating waveplate followed by a polarizer acts like a Stokes polarimeter (see, e.g., Collett, *Polarized Light: Fundamentals and Applications*, Marcel Dekker, Inc. at 102–107 (1993) and Williams, "Rotating-Wave-Plate Stokes Polarimeter for Differential Group Delay Measurements of Polarization-Mode Dispersion," *Applied Optics*, Vol. 38, No. 31 at 6508–6515 (Nov. 1, 1999)). Conventional polarimeters, however, require the physical rotation of the waveplate. Unfortunately, physically rotation is relatively slow because it is limited to the speed of a mechanical actuator (e.g., step motor) used to induce the rotation.

Nonetheless, physical rotation causes the pointing direction of the principal axis of the waveplate to rotate, which changes the way a light beam experiences the birefringence during propagation through the device. As used herein, the "principal axis" refers to the birefringent axis of a birefringent medium (crystalline or otherwise). Thus, the term "angle" or "waveplate angle" θ refers to a relative pointing direction of a device's principal axis with respect to another arbitrary axis, such as an axis fixed with respect to the laboratory reference frame.

Stokes polarimeters can be used to measure the Stokes parameters (i.e., vectors) of a light beam propagating in an optical telecommunications network. These measured parameters can, in turn, be used to calculate the light beam's state of polarization (hereinafter, "SOP") and degree of polarization (hereinafter, "DOP"). Because conventional Stokes polarimeters operate at speeds no greater than 100 kHz, DOP updates are, unfortunately, also limited to these speeds. Moreover, the required tracking and measurement speeds can significantly increase when transmission sources use variable chirped lasers to combat nonlinear effects. Such variations can cause extremely rapid changes in the PSP of an optical fiber due to second order polarization mode dispersion effects. Thus, it may be necessary to measure DOP at rates exceeding 1 MHz—ten times greater than is currently available.

Thus, it would be desirable to provide methods and apparatus for Stokes polarimetry that are fast, reliable, compact, and cost effective.

It would also be desirable to provide methods and apparatus for fast optical distortion compensation, and especially for fast polarization mode dispersion compensation.

SUMMARY OF THE INVENTION

It is therefore an object of this invention to provide methods and apparatus for measuring Stokes parameters and other derivable quantities.

It is another object of this invention to provide methods and apparatus for Stokes polarimetry that are fast, reliable, compact, and cost effective.

It is yet another object of this invention to provide methods and apparatus for Stokes polarimetry that are simple to integrate into conventional optical circuits.

It is yet another object of this invention to provide methods and apparatus for fast optical distortion compensation, and especially for fast polarization mode dispersion compensation.

These and other objects are accomplished in accordance with the principles of the present invention by providing methods and apparatus for Stokes polarimetry. A Stokes polarimeter according to this invention can include a rotatable waveplate comprising a variable birefringent material, and a polarizer optically downstream from the waveplate.

An optical distortion compensator according to this invention includes (1) a polarization transformer having an optical input and an optical output, (2) an optical distortion generator having at least one electrical input, an optical input, and an optical output, wherein the generator input is coupled to the transformer output, (3) a Stokes polarimeter having an optical input coupled to the generator output, and (4) a feedback controller having an electrical input and at least one electrical output, wherein said controller input is coupled to said analyzer output and said at least one electrical output is coupled to said generator at least one electrical input.

Further features of the invention, its nature and various advantages will be more apparent from the accompanying drawings and the following detailed description of the preferred embodiments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

This invention provides methods and apparatus capable of tracking and measuring Stokes polarization vectors and DOP at rates in excess of 1 MHz, including the rapid tracking of changes in the principal state of polarization ("PSP") and DOP in optical fiber transmission lines.

A Stokes polarimeter according to this invention includes at least a rotatable waveplate made from a variable birefringent material and a polarizer optically downstream from the waveplate. The waveplate can be implemented, for example, in electro-optically variable birefringent materials in bulk form, waveguide form, or any combination of both, as long as retardation can be held substantially fixed while the angle is varied. In the case of lithium niobate, for example, the angle can be varied endlessly and without any resetting. The combination allows for the rapid measurement of Stokes polarization vectors using a simple Fourier analysis of the optical data exiting the polarizer.

As used herein, the term "rotatable waveplate" refers to any device that can vary the pointing direction of its principle axis while keeping its retardation substantially fixed. The rotatable waveplate can be constructed from one or more stages. Also, the waveplate can be made from any variable birefringent material, such as any electro-optic material, acousto-optic material, magneto-optic material, etc.

Examples of electro-optic materials that can be used in accordance with this invention include, for example, lithium niobate, a lanthanum modified lead zirconate titanate ceramic, electro-optic polymers, etc. Thus, the waveplate can be a polarization transformer or a TE-TM mode converter.

When the rotatable waveplate is constructed from an electro-optical material (e.g., lithium niobate), its pointing direction can be varied by applying an appropriately varying electric field. In this case, the birefringent axis is the major axis of the electro-optically induced birefringence ellipse. Thus, when an electric field is applied across an electro-optic medium, a voltage-induced birefringence occurs.

A rotatable waveplate made from a variable birefringent material can be in the form of a waveguide or a bulk crystal. When the material is an electro-optic material, such as lithium niobate, the electro-optic effect is generally small and the electric field necessary to produce a useful amount of retardation is relatively large (e.g., 100,000 V/cm). It will be appreciated, then, that a relatively small lithium niobate waveguide can be preferable to bulk lithium niobate crystals because even small voltages can produce large electric fields over small distances, which, in the case of waveguides, can be on the order of microns.

Figure 1:
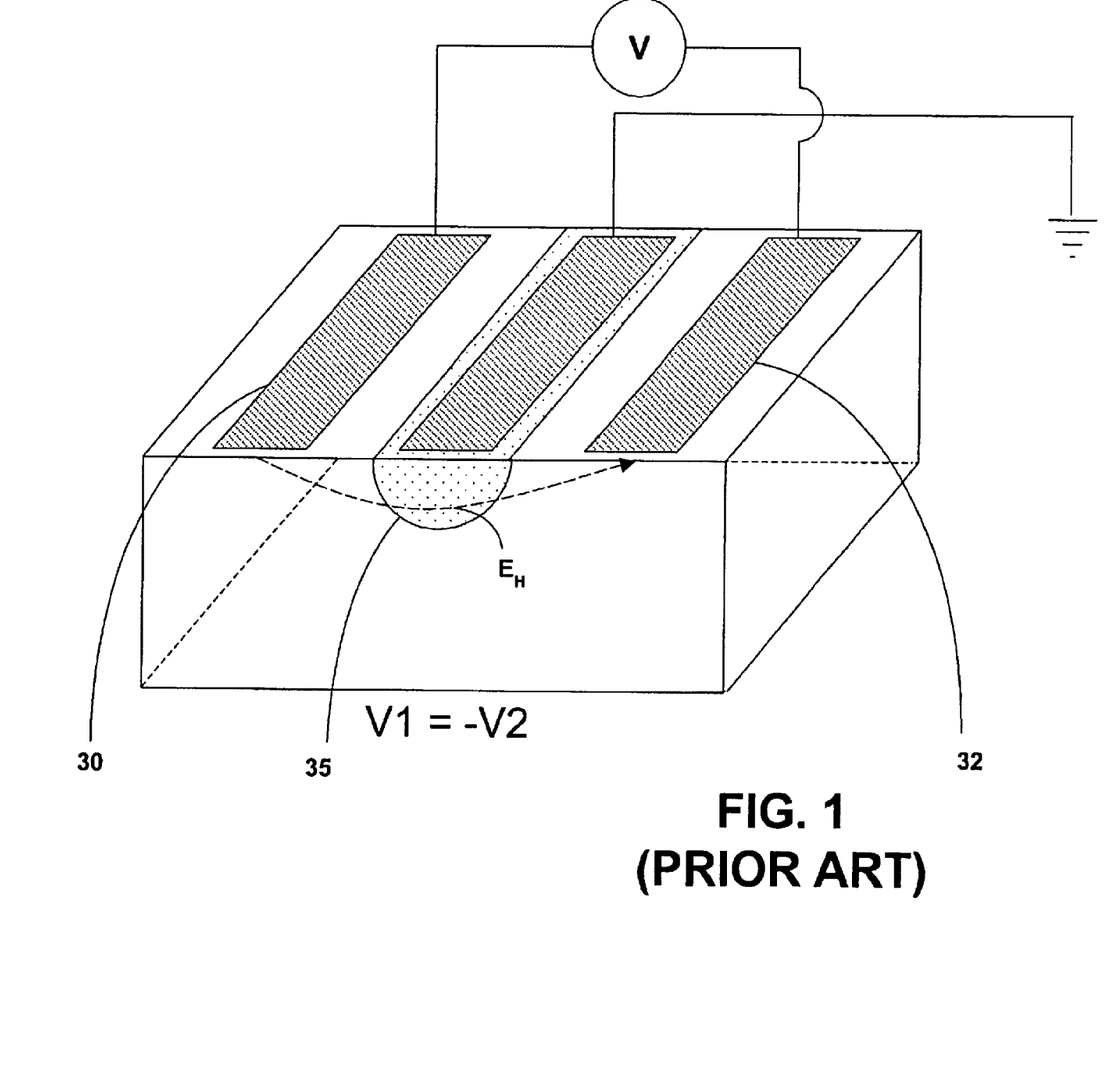
FIG. 1 shows a perspective view of a lithium niobate waveguide embedded in a substrate with three electrodes inducing a substantially horizontal electric field within the waveguide (upper cladding not shown)
Figure 2:
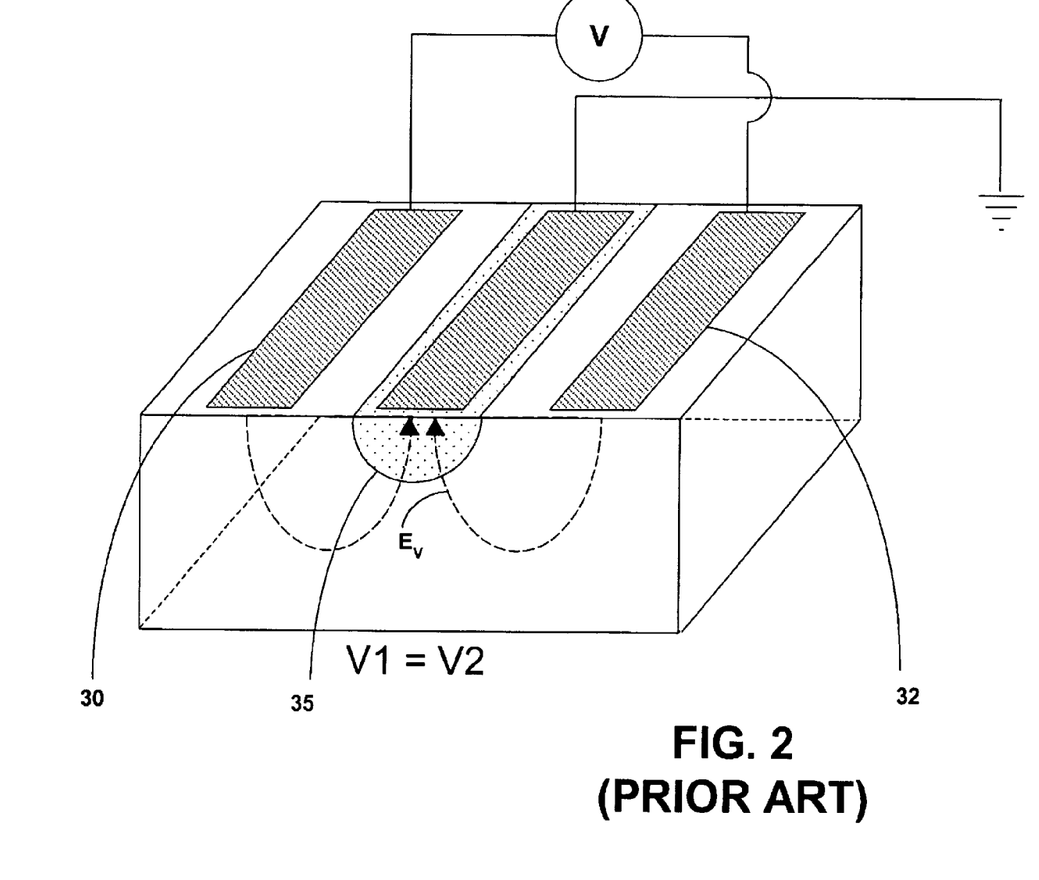
FIG. 2 shows a perspective view of the same lithium niobate waveguide of FIG. 2 inducing a substantially vertical electric field within the waveguide (upper cladding not shown)

A rotatable waveplate can be formed using a waveguide using three separately addressable electrodes. See, for example, Suwat Thaniyavarn, "Wavelength-independent, optical-damage-immune LiNbO3 TE-TM mode converter," *Optics Letters* Vol. 11, No. 1 (January 1986). FIGS. 1 and 2 show (in accordance with the methods shown by Thaniyavarn) how a single lithium niobate device can generate horizontal and vertical electric fields, respectively. In both FIGS., the center electrode is grounded. As shown in FIG. 1, when the voltages applied to outer electrodes 30 and 32 are opposite in sign (e.g., $V_1 = -V_2$), a substantially horizontal electric field EH is generated in waveguide 35. However, when the voltages that are applied to electrodes 30 and 32 have the same sign (e.g., $V_1 = V_2$), a substantially vertical electric field $E_V$ is generated.

More generally, varying the ratio of the vertical electric field to the horizontal electric field can control the direction of the principal axis, thereby providing polarization control. That is, $\tan(2\theta) = E_V/E_H$ and retardation $\Gamma$ is proportional to $(E_V^2 + E_H^2)^{1/2}$, where the waveplate angle is $\theta$. Note that these conditions can be satisfied when $E_H$ is proportional to $\cos(2\theta)$ and $E_V$ is proportional to $\sin(2\theta)$. Importantly, the angle can be varied endlessly in a positive or negative direction, even though the applied fields are bounded. According to one control scheme, the magnitude of the applied voltages can be:

$$V_1 = \Gamma[V_A \sin(\alpha) + V_B \cos(\alpha)] + V_C, \text{ and}$$

$$V_2 = \Gamma[V_A \sin(\alpha) - V_B \cos(\alpha)] - V_C,$$

where A, B, and C are substantially fixed voltages (they may vary somewhat with temperature), and $\Gamma$ is the desired waveplate retardation.

Figure 3:
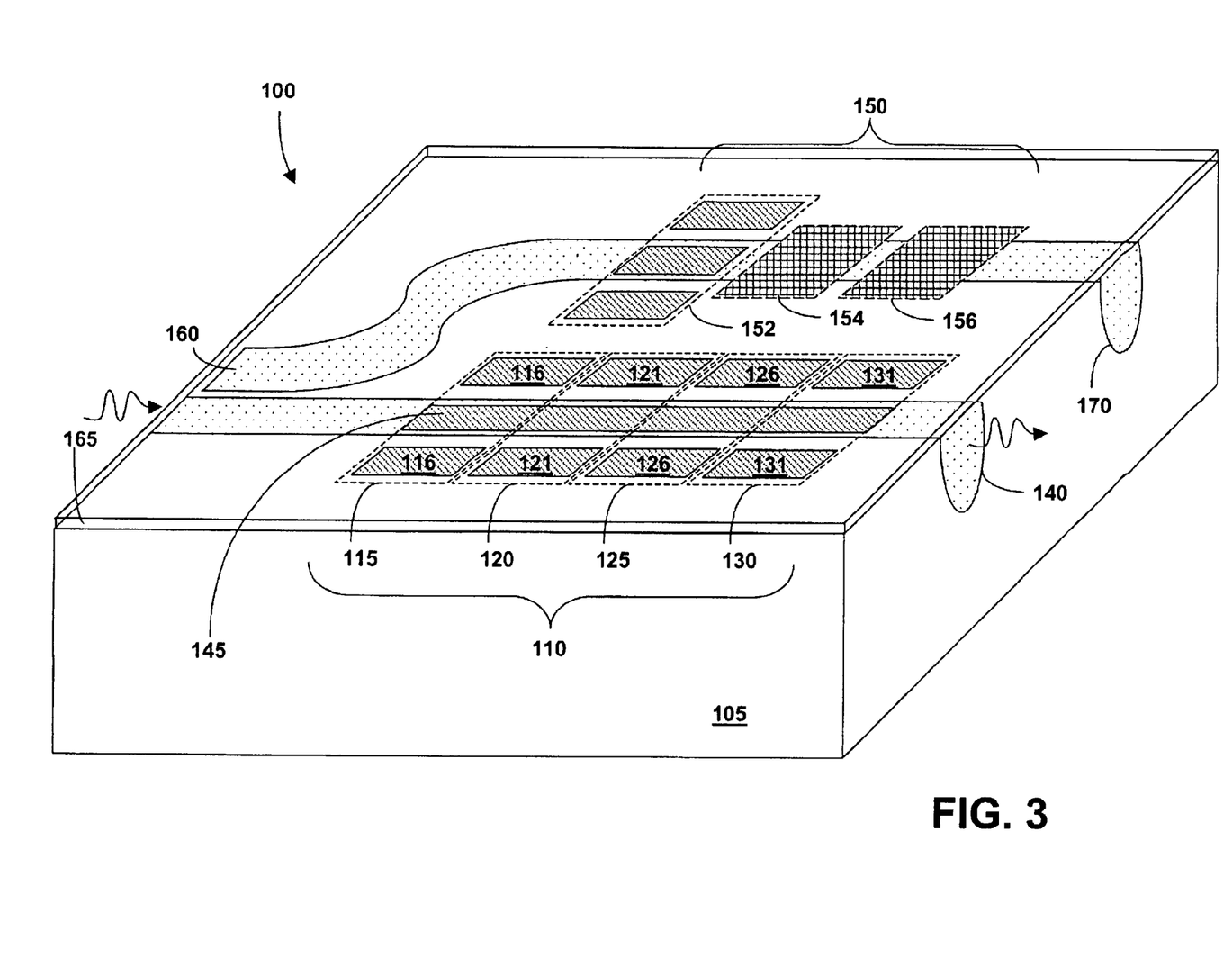
FIG. 3 shows a perspective view of a four-section waveguide-based polarization transformer and an integrated Stokes polarimeter according to this invention.

To ensure precise angular control, fixed voltages $V_A$, $V_B$, and $V_C$ are preferably known to a high degree of accuracy. It will be appreciated that the polarization transformer can include a repeating cascade of varying or alternating length sections, as shown in FIG. 3, for example.

Thus, when driven with a certain combination of voltages, the lithium niobate material can act as a rapidly rotating quarter waveplate. Since the operation frequency of a lithium niobate polarization transformer can simulate a rotating waveplate at speeds in excess of 100 MHz per revolution, Stokes polarization vectors can be measured up to that rate, subject only to processing speed limitations.

As shown in FIGS. 1 and 2, the rotatable waveplate can be integrated into a waveguide structure. As also shown in FIG. 3, the polarizer, as well as other related components (e.g., a detector), can be integrated into the same waveguide structure. Such integration provides at least two significant advantages over current Stokes parameter measurement techniques.

First, variable birefringent materials, such as lithium niobate, are the fastest and most robust materials for constructing endless polarization controlling devices. These devices can map an arbitrary and unknown polarization state to a known polarization state. Thus, an integrated polarimeter according to this invention can be fast, robust, and operate endlessly.

Second, when a polarimeter is integrated with another device, such as a polarization mode dispersion compensator, the combination can be extremely small and inexpensive to manufacture. In fact, the additional cost of adding the polarizer's rotatable waveplate is practically negligible because most of the processing steps were already necessary to form primary polarization controller.

FIG. 3 shows integrated optical circuit 100, which includes primary polarization transformer/controller 110 and polarimeter 150. Primary transformer 110 includes four discrete sections 115, 120, 125, and 130. It will be appreciated, however, that primary transformer 110 can include any number of sections, as desired. Each of these sections can include a bulk variable birefringent (e.g., electro-optical) element or, as shown in FIG. 3, can share common variable birefringent (e.g., electro-optical) waveguide 140. Also, these sections can have the same or different physical dimensions and can be made from the same or different materials.

Each of sections 115, 120, 125, and 130 can be driven as a "λ/n" waveplate (i.e., λ/4 or any quarter-wave waveplate). Each of waveplate sections 115, 120, 125, and 130 include pair of outer electrodes 116, 121, 126, and 131, respectively, and share common central electrode 145. In an alternate embodiment, each section could have a separate central electrode. By applying appropriate voltages $V_1$ and $V_2$ (see above) to each pair of outer electrodes, each section can be effectively rotated to arbitrary waveplate angle α (not shown).

Polarimeter 150 includes rotatable waveplate section 152, polarizer 154, and photodetector 156. Waveplate section 152 operates on the same principles described with respect to any of sections 115, 120, 125, and 130. As described more fully below, some sort of external controller normally controls rotatable waveplate 152. Also, the intensity measurements performed by the photodetector are processed by a computing device programmed to calculate Stokes vectors or some other Stokes-related quantity.

As shown in FIG. 3, polarizer 154, in addition to controller 152, can also be integrated into substrate 105. It will be appreciated that only a few additional processing steps are required to integrate polarizer 154 into the same substrate as primary polarization controller 110. If integrated, the polarizer can be, for example, a thin-film polarizer, a micro-optic polarizer, a polarization diversity splitter, or the like. Upper cladding 165 is also shown in FIG. 3.

For example, a thin film polarizer can be added using any appropriate material. An inexpensive way to form a thin film polarizer is to coat the waveguide with a thin metal cladding of optimized thickness. Other ways may involve the deposition of materials with absorption in the 1.3 or 1.5 $\mu$m optical bands, for example, with optimized thinknesses. Alternatively, the polarizer can be formed by grafting thin films with appropriate absorption or polarizing characteristics onto lithium niobate waveguides using solder, optical adhesives, or epoxies. In the absence of an integrated optical polarizer, a fiber polarizer or bulk $\mu$-optic polarizer can be used at the waveguide output. Thus, the polarizer can be implemented inside or outside the main package.

Figure 4:
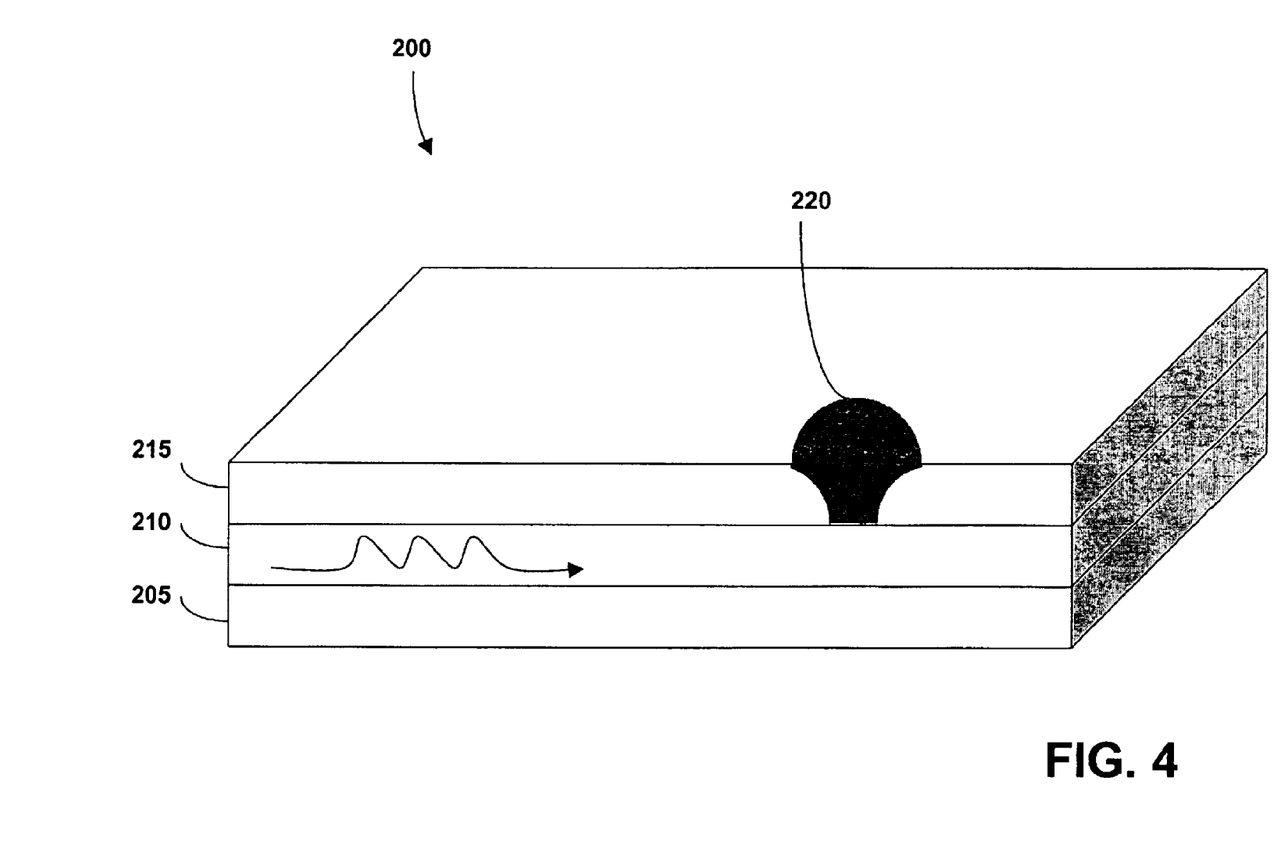
FIG. 4 shows a perspective view of a planar waveguide structure including an integrated polarizer according to this invention.

FIG. 4 shows a perspective view of planar waveguide structure 200, which includes substrate 205, planar waveguide 210, upper cladding 215, and integrated thin film polarizer 220 according to this invention.

It will be appreciated that although thin film polarizer 220 is formed on a planar waveguide (i.e., two-dimensional confinement), polarizer 220 could just as easily be formed on a linear waveguide (i.e., one-dimensional confinement), such as the ones shown in FIGS. 1–3. It will also be appreciated that although only polarizer 220 is shown in FIG. 4, other Stokes polarimeter components are not shown for illustrative simplicity.

If the polarizer is not integrated into the same waveguide structure as the polarization controller, the polarizer can be selected from other polarizer types, including, for example, a Glan-Thomson polarizer, a dichroic polarizer, a liquid crystal polarizer, a fiber optical polarizer, a polarization diversity splitter, or any combination thereof.

Figure 5:
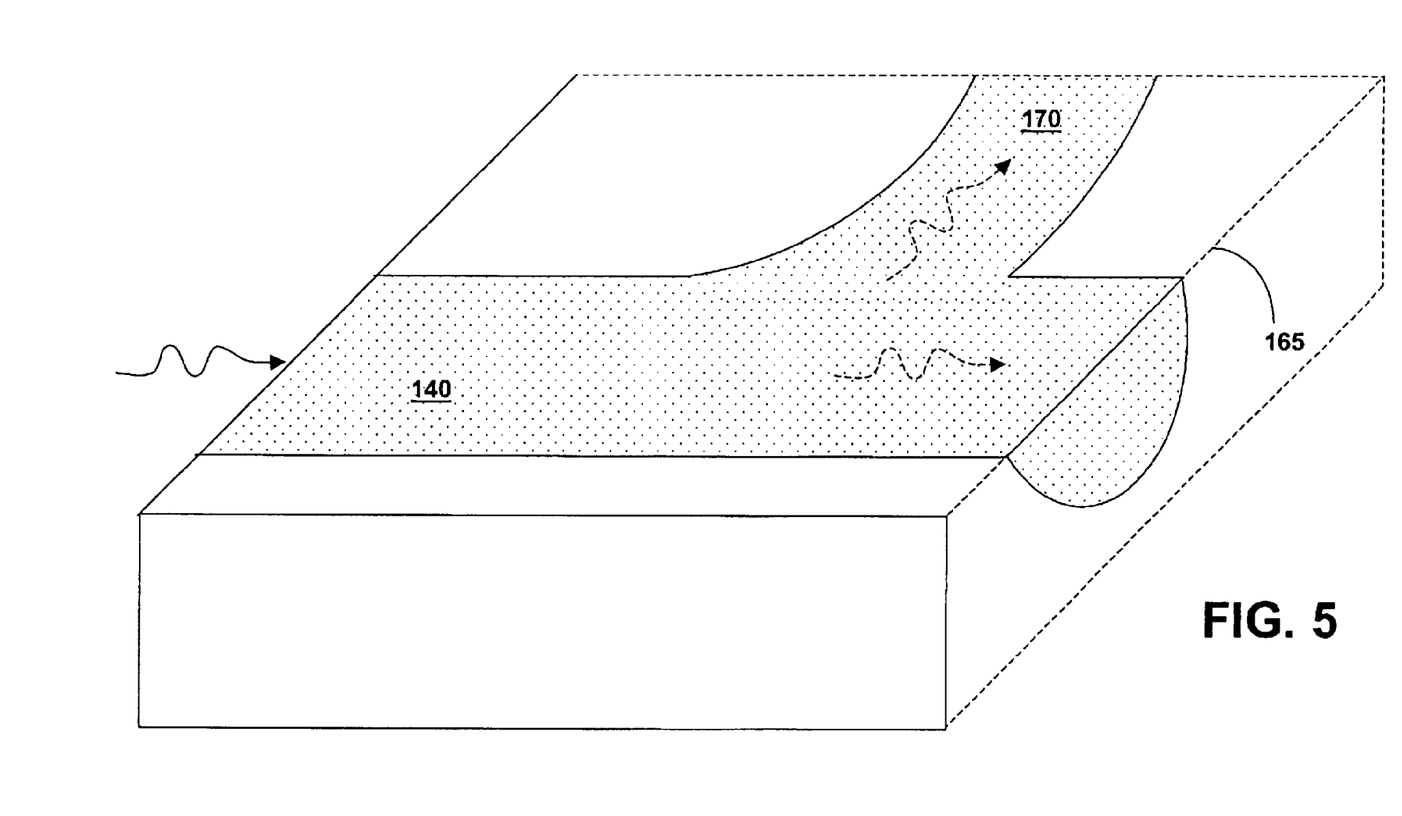
FIG. 5 shows a perspective view of a y-branch tap that can be used in an integrated optical circuit according to this invention.

As shown in FIG. 3, when polarimeter 150 and polarization transformer 110 are integrated into a common substrate, a Y-branch split or directional coupler tap can be used to form an inexpensive optical connection between waveguide 140 and waveguide 170. FIG. 3 shows directional coupler tap 160, which can be designed to tap an arbitrary amount of light from waveguide 140. As an alternative, FIG. 5 shows illustrative Y-branch split 165, which can also be designed to redirect an arbitrary amount of light from waveguide 140 into waveguide 170.

Finally, as schematically shown in FIG. 3, photodetector 156 can be integrated into the same optical circuit 100 as the other polarimeter components. Photodetector 156 can be constructed according to any integrated construction technique. Alternatively, the addition of a coarsely aligned fiber pigtail can be used to direct the output of polarizer 154 to an external photodetector (not shown).

As mentioned above, Stokes polarimeter 150 can include a waveplate controller and some sort of a computing device.

During operation, the waveplate controller causes the rotatable waveplate to sweep through an angle of $2\pi$ (using the equations for $V_1$ and $V_2$, above). The sweeping can be performed continuously or discontinuously while the photodetector makes appropriate intensity measurements. The computing device is used to perform Stokes calculations, as described below.

To calculate Stokes parameters, four terms A, B, C, and D, are calculated using intensity I measurements made by the detector located at the back end of the polarimeter. A is a dc term, B is a double frequency term, and C and D are quadruple frequency terms in quadrature. The intensity measurements can be performed continuously or discretely while the angle of the rotatable waveplate is varied.

For example, terms A, B, C, and D can be calculated continuously as follows:

$$A = \frac{1}{\pi}\int_0^{2\pi} I(\theta)d\theta;$$

$$B = \frac{2}{\pi}\int_0^{2\pi} I(\theta)\sin(2\theta)d\theta;$$

$$C = \frac{2}{\pi}\int_0^{2\pi} I(\theta)\cos(4\theta)d\theta; \text{ and}$$

$$D = \frac{2}{\pi}\int_0^{2\pi} I(\theta)\sin(4\theta)d\theta;$$

where $\theta$ is the angle of the rotatable waveplate.

Alternatively, terms A, B, C, and D can be calculated using discrete intensity measurements. When the computing device is programmed to calculate A, B, C, and D substantially as follows:

$$A = \frac{2}{N}\sum_{n=1}^{N} I(n\theta_i);$$

$$B = \frac{4}{N}\sum_{n=1}^{N} I(n\theta_i)\sin(2n\theta_i);$$

$$C = \frac{4}{N}\sum_{n=1}^{N} I(n\theta_i)\sin(4n\theta_i); \text{ and}$$

$$D = \frac{4}{N}\sum_{n=1}^{N} I(n\theta_i)\sin(4n\theta_i);$$

where I is an intensity measurement and N is an integral number of discrete intensity measurements. If the number of measurements is sixteen, for example, then terms A, B, C, and D can be calculated as follows:

$$A = \frac{1}{8}\sum_{n=1}^{16} I(n\frac{\pi}{8});$$

$$B = \frac{1}{4}\sum_{n=1}^{16} I(n\frac{\pi}{8})\sin(n\frac{\pi}{4});$$

$$C = \frac{1}{4}\sum_{n=1}^{16} I(n\frac{\pi}{8})\cos(n\frac{\pi}{2}); \text{ and}$$

$$D = \frac{1}{4}\sum_{n=1}^{16} I(n\frac{\pi}{8})\sin(n\frac{\pi}{2}).$$

Once A, B, C, and D are known, Stokes parameters $S_0$, $S_1$, $S_2$, and $S_3$ can be calculated as follows:

$$S_0 = \frac{A-C}{\tan^2(\delta/2)};$$

$$S_1 = \frac{C}{\sin^2(\delta/2)};$$

$$S_2 = \frac{D}{\sin^2(\delta/2)}; \text{ and}$$

$$S_3 = \frac{B}{\sin(\delta)};$$

where $\delta$ is the true retardance of the nominally quarter-wave plate. By allowing $\delta$ to have a value other than 90 degrees, for example, imperfections in the quarter-wave retarder can be accounted for.

Once the Stokes parameters are calculated, DOP and other related quantities can be calculated. DOP, for example, can be calculated as follows:

$$DOP = \frac{S_0 - \sqrt{S_{12} + S_{22} + S_{32}}}{S_0}.$$

All of the methods according to this invention can be performed using a computing device, which can be, for example, an application specific integrated circuit, a programmable microprocessor, or a general-purpose computer programmed to perform the method. Alternatively, the entire calculation (i.e., program) could be implanted in hardware.

Figure 6:
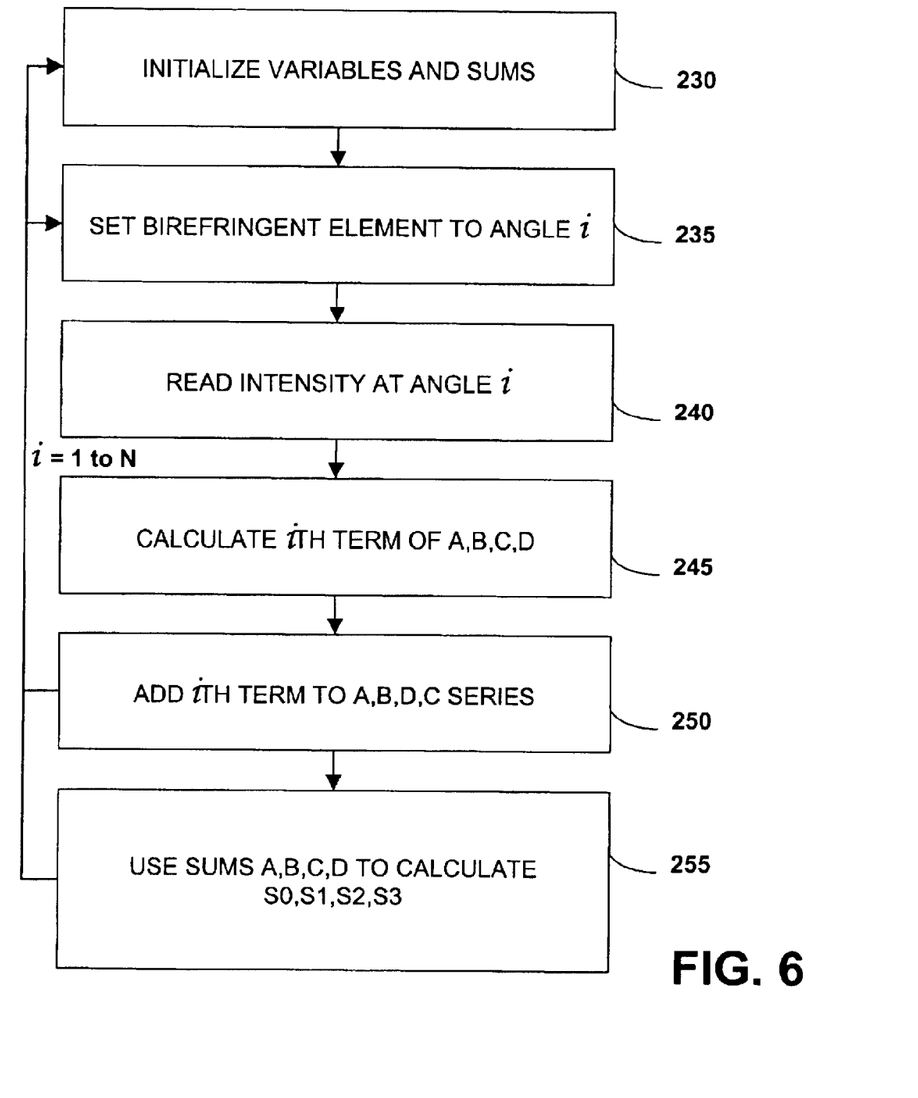
FIG. 6 shows a flow chart of a method for operating a Stokes polarimeter according to this invention.

FIG. 6 shows a flow chart of an illustrative method for operating a Stokes polarimeter according to this invention. The method makes N discrete intensity measurements, but can easily be extrapolated to make partially continuous or continuous intensity measurements as described above. The method includes first initializing any variables (e.g., i, A, B, C, D, $S_0$, $S_1$, $S_2$, and $S_3$) in step 230. After initialization, the polarimeter's rotatable waveplate is set to a specified rotational angle in step 235, each such angle corresponding to integer index i that sweeps from 1 to N.

After the angle is set, the detector measures the intensity at the specified angle in step 240. That intensity measurement is then used to calculate the ith term of the sum for A, B, C, and D in step 245. After that term is calculated, it is added to any previous terms previously calculated for A, B, C, and D in step 250. Once all N terms are summed, A, B, C, and D are fully determined. Then, in final step 255, $S_0$, $S_1$, $S_2$, and $S_3$ can be calculated. This entire process can be performed repeatedly at extremely high speeds, enabling Stokes calculations to be performed very quickly.

As discussed above, a Stokes polarimeter according to this invention can be used to measure Stokes vectors that can be used to calculate various quantities that can be used as a feedback signal in an optical distortion compensator. As also discussed above, one type of optical distortion is polarization mode dispersion (hereinafter, "PMD"), which is generally recognized as a problem for high-bit rate optical transmission.

A brief description of PMD follows, as well as methods of calculating and providing feedback signals for use in adaptive PMD compensators.

PMD is caused by variations in birefringence along the optical path that causes the orthogonal optical signal polarization modes to propagate at different velocities. The primary cause of PMD is the asymmetry of the fiber-optic strand. Fiber asymmetry may be inherent in the fiber from the manufacturing process, or it may be a result of mechanical stress on the deployed fiber. Environmental changes are dynamic and statistical in nature, and are believed to result in PMD changes that can last for variable periods of time and vary with wavelength, with the potential for prolonged degradation of data transmission. One solution to the PMD problem is to adaptively compensate for the PMD.

To understand PMD compensation, it is first necessary to understand better how PMD arises. Generally, PMD is introduced into an optical signal during transmission along an optical fiber because small stresses in the fiber induce eccentricities into the normally circular fibers, which can cause the light to propagate at slightly different velocities along two orthogonal directions. A typical fiber, which could be hundreds of kilometers long, normally undergoes varying degrees of stress along its length. That length can be approximated as a number of concatenated shorter sections in which the two propagating velocities are constant within each section. This is known to result in a certain phase delay between the two polarization modes. The principal optical axes in various sections may be randomly oriented with respect to each other.

Figure 7:
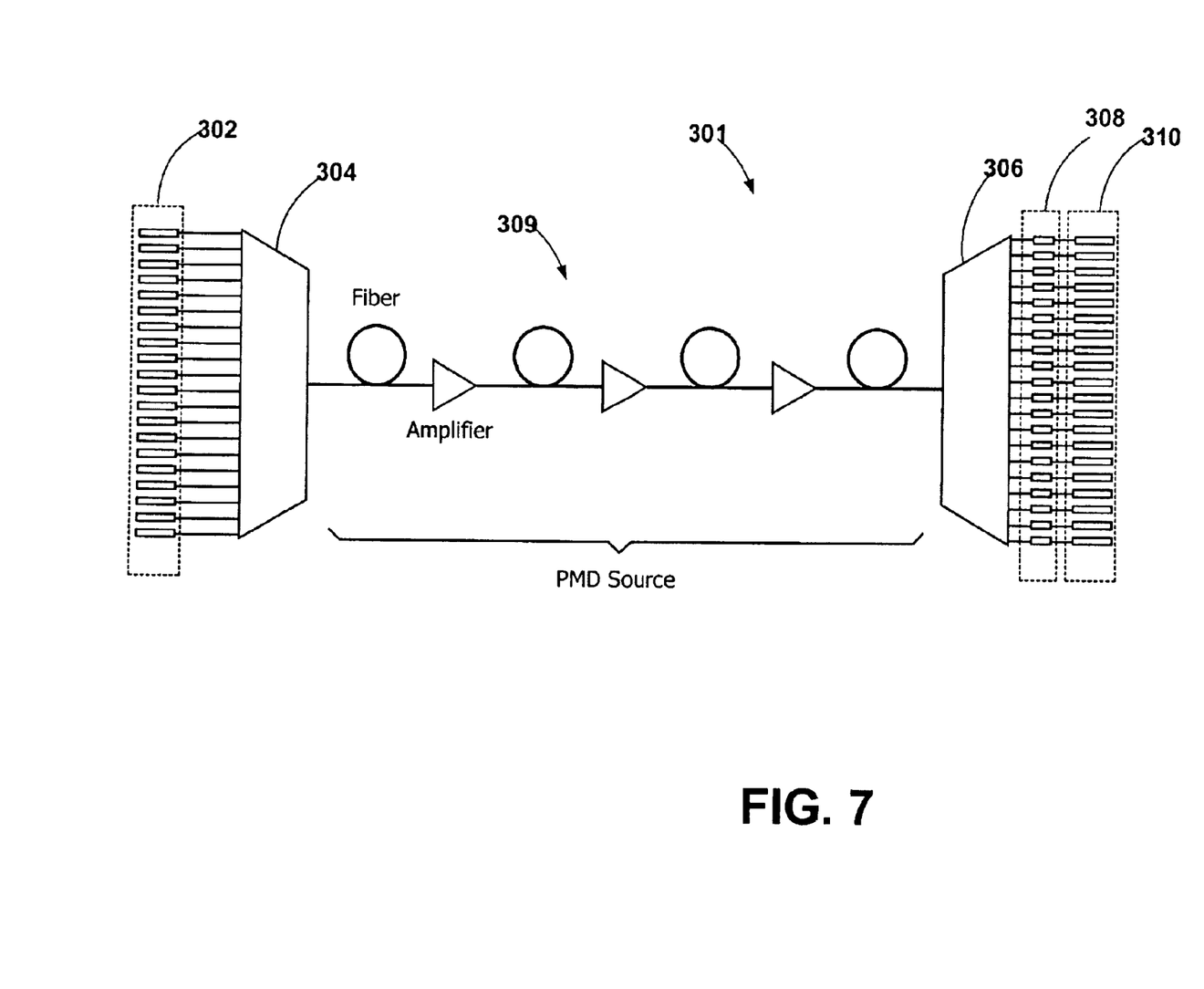
FIG. 7 shows a basic architecture for a dispersion compensated wavelength-division multiplexed transmission system according to this invention.

PMD compensators can be used in fiber-optic transmission systems, such as wavelength-division multiplexed (hereinafter, "WDM") systems. FIG. 7, for example, illustrates a basic architecture for WDM transmission system 301. A number of laser transmitters 302, each with distinct center frequencies and with distinct signal information, generate separate optical signals. Using optical multiplexer (hereinafter, "MUX") 304, the generated optical signals are combined and transmitted along optical transmission line 309. Transmission line 309 can include any number of fiber and optical amplifier stages (shown), each of which can act as PMD impairment sources. After transmission across line 309, the transmitted signal is separated by frequency with optical demultiplexer (hereinafter, "DMUX") 306. Typically, each signal frequency is then detected at dedicated optical receiver 310.

PMD compensators 308 can be placed between optical DMUX 306 and receiver 310 to mitigate, in part or in full, the PMD impairment from the transmission of the combined signal. As shown in FIG. 7, one PMD compensator can be provided for each receiver. Other types of compensation schemes, in which compensator are placed at locations different than the ones shown in FIG. 7, are also known.

As explained more fully below, a PMD compensator generally includes a polarization transformer that is controlled with one or more control parameters using a feedback signal. The feedback signal can be determined using the Stokes parameters measured according to this invention.

During operation, the PMD compensator generally receives a PMD-impaired light beam having an initial SOP and transforms the SOP in such a way as to reduce the amount of PMD impairment. Because the initial and target SOPs are generally unknown during compensation, the control parameters are normally dithered to determine whether an adjustment of the parameter can be used to reduce PMD impairment, and improve the optical signal's quality.

Figure 8:
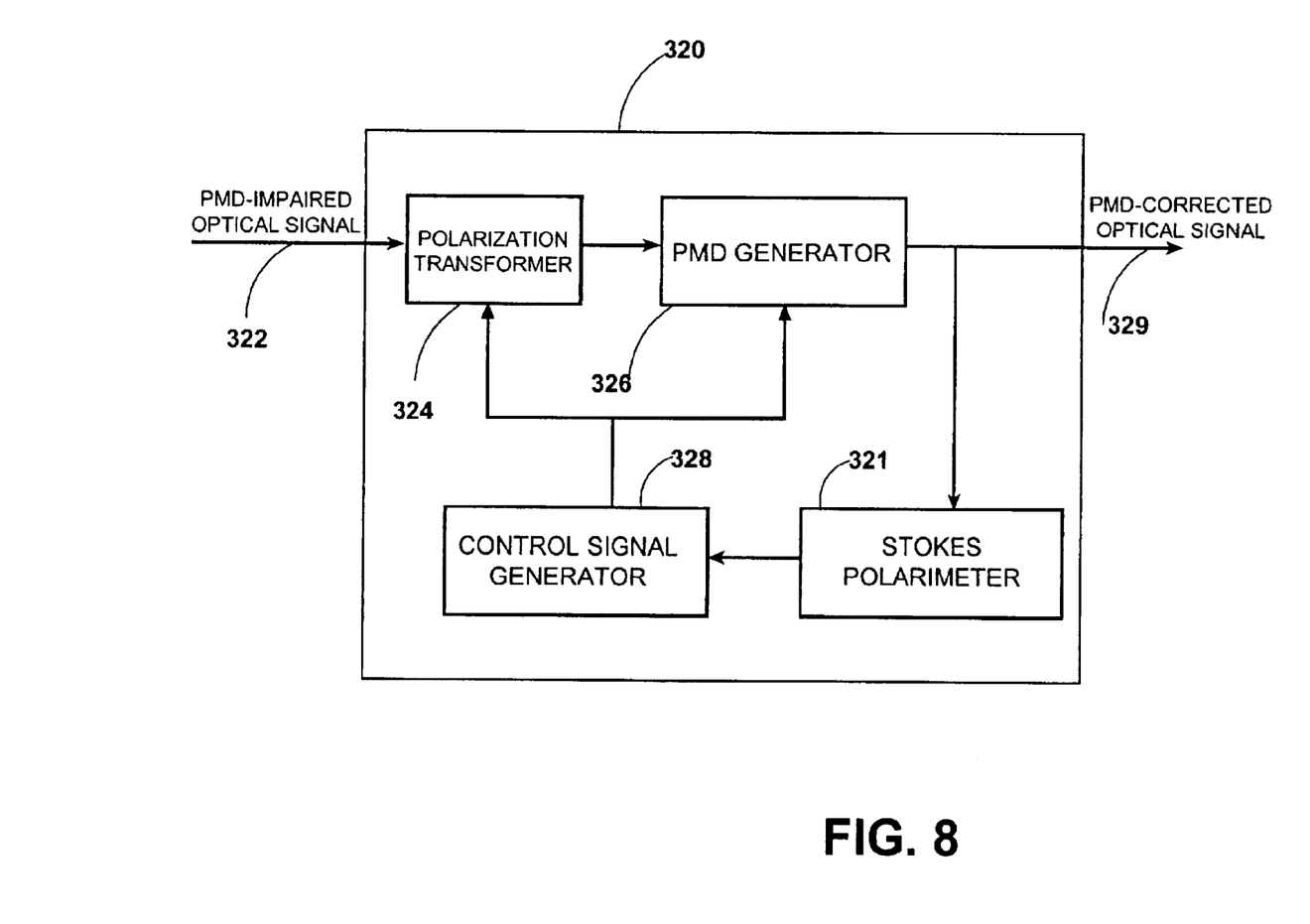
FIG. 8 shows an illustrative block diagram of a polarization mode dispersion compensator that can be used according to this invention.

FIG. 8 shows an illustrative block diagram of PMD compensator 320. During operation, PMD compensator 320 receives PMD-impaired optical signal 322. Within compensator 320, signal 322 is first received by polarization transformer 324, which transforms the state of polarization of the optical signal for reception at PMD generator 326.

Subsequent PMD generator 326 receives the optical signal from polarization transformer 324, adds PMD to the signal, and transmits the optical signal to optical output 329 of PMD compensator 320. The PMD generator can, for example, include two or more birefringent elements, such as two polarization-maintaining fibers, and an intermediate polarization transformer. It will be appreciated that there are many other PMD generator architectures that can be used according to this invention.

It will be appreciated that a difference between PMD transformer 324 and PMD generator 326 is that while transformer 324 is can add an amount of retardation, PMD generator 326 can add much larger amounts, usually substantially more than a full wavelength, and often tens, hundreds, or even thousands of wavelengths. To achieve such large amounts of retardation, generators generally include two relatively long, highly birefringent elements, such as highly birefringent fibers, separated by another polarization transformer, By transforming the SOP of the light with respect to the birefringent axes of the fiber with the intermediate transformer, a variable amount of PMD (e.g., differential group delay) can be generated.

In order to generate a feedback signal that controls polarization transformer 324 and PMD generator 326, a fraction of the optical signal, after passing through generator 326, is directed to Stokes polarimeter 321. Polarimeter 321, then, can generate any metric characterizing the quality of the signal, which can then be provided to control signal generator 328. The combination of polarization transformer 324, PMD generator 326, polarimeter 321, and control signal generator 328, forms a closed-loop, dynamic feedback system. Polarization transformer 324 and PMD generator 326 are normally controlled such that optical output 329 suffers minimal PMD impairment.

As explained above, and according to one embodiment of this invention, a primary polarization transformer/controller of a PMD compensator can reside in the same package with the Stokes polarimeter. This eliminates the need to use a separate component to perform a Stokes vector measurement. Moreover, integration of the Stokes polarimeter can be seamless, allowing the total device size to remain relatively small.

Thus, improved methods and apparatus for Stokes polarimetry are provided. One skilled in the art will appreciate that the present invention can be practiced by other than the described embodiments, which are presented for purposes of illustration and not of limitation. For example, polarization dependent loss controllers, optical polarization trackers, principle state compensators, and high precision polarization scramblers can be constructed according to this invention. The present invention is limited only by the claims that follow.

I claim:

1. A Stokes polarimeter comprising:

a rotatable waveplate receiving an optical signal and comprising a variable birefringent material;

a polarizer optically downstream from the rotatable waveplate receiving the optical signal from an output of the rotatable waveplate;

a photodetector optically downstream from the polarizer receiving the optical signal from an output of the polarizer and generating intensity measurements characterizing the optical signal; and, a computing device performing Stokes calculations based on terms A, B, C, and D related to the intensity measurements;

wherein said computing device is programmed to calculate terms A, B, C, and D substantially as follows:

$$A = \frac{1}{\pi} \int_0^{2\pi} I(\theta) d\theta;$$

$$B = \frac{2}{\pi} \int_0^{2\pi} I(\theta) \sin(2\theta) d\theta;$$

$$C = \frac{2}{\pi} \int_0^{2\pi} I(\theta) \cos(4\theta) d\theta; \text{ and}$$

$$D = \frac{2}{\pi} \int_0^{2\pi} I(\theta) \sin(4\theta) d\theta;$$

where I is an intensity measurement made at angle θ.

2. The polarimeter of claim 1 wherein said variable birefringent material is selected from a group consisting an electro-optical material, an acousto-optical material, a magneto-optical material, and any combination thereof.

3. The polarimeter of claim 2 wherein said birefringent material comprises said electro-optical material selected from a group consisting of lithium niobate, a lanthanum modified lead zirconate titanate ceramic, an electro-optic polymer, and any combination thereof.

4. The polarimeter of claim 3 wherein said electro-optical material is lithium niobate.

5. The polarimeter of claim 2 wherein said birefringent material has a form selected from a group consisting of a waveguide and a bulk crystal.

6. The polarimeter of claim 5 wherein said form is a waveguide integrated into a substrate.

7. The polarimeter of claim 6 wherein said polarizer is also integrated into said substrate.

8. The polarimeter of claim 7 wherein said polarizer is selected from a group consisting of a thin-film polarizer, a micro-optic polarizer, and a polarization diversity splitter.

9. The polarimeter of claim 1 wherein said polarizer is selected from a group consisting of a Glan-Thomson polarizer, a dichroic polarizer, a liquid crystal polarizer, a fiber optical polarizer, a polarization diversity splitter, and any combination thereof.

10. The polarimeter of claim 1 wherein said polarimeter further comprises:

a controller for said rotatable waveplate capable of causing a rotational angle of said waveplate to vary.

11. The polarimeter of claim 1 wherein said computing device is programmed to calculate Stokes parameters $S_0$, $S_1$, $S_2$, and $S_3$ substantially as follows:

$$S_0 = \frac{A - C}{\tan^2(\delta/2)};$$

$$S_1 = \frac{C}{\sin^2(\delta/2)};$$

$$S_2 = \frac{D}{\sin^2(\delta/2)}; \text{ and}$$

$$S_3 = \frac{B}{\sin(\delta)};$$

where δ is the true retardance of the rotatable waveplate.

12. The polarimeter of claim 1 wherein said rotatable waveplate has at least three electrodes and said polarimeter further comprises a controller for controlling said waveplate, said controller applying at least two voltages $V_1$ and $V_2$ to said electrodes substantially as follows:

$V_1 = \Gamma[V_A \sin(\alpha) + V_B \cos(\alpha)] + V_C$, and $V_2 = \Gamma[V_A \sin(\alpha) - V_B \cos(\alpha)] - V_C$, where $V_A$, $V_B$, and $V_C$ are substantially fixed voltages and Γ is the desired waveplate retardance.

13. A Stokes polarimeter comprising:
a rotatable waveplate receiving an optical signal and comprising a variable birefringent material;
a polarizer optically downstream from the rotatable waveplate receiving the optical signal from an output of the rotatable waveplate
a photodetector optically downstream from the polarizer receiving the optical signal from an output of the polarizer and generating intensity measurements characterizing the optical signal; and,
a computing device performing Stokes calculations based on terms A, B, C, and D related to the intensity measurements;
wherein said computing device is programmed to calculate terms A, B, C, and D substantially as follows:

$$A = \frac{2}{N}\sum_{n=1}^{N} I(n\theta_i);$$

$$B = \frac{4}{N}\sum_{n=1}^{N} I(n\theta_i)\sin(2n\theta_i);$$

$$C = \frac{4}{N}\sum_{n=1}^{N} I(n\theta_i)\cos(4n\theta_i); \text{ and}$$

$$D = \frac{4}{N}\sum_{n=1}^{N} I(n\theta_i)\sin(4n\theta_i);$$

where I is an intensity measurement made at angle $\theta_i$, and N is an integral number of discrete intensity measurements.

14. The polarimeter of claim 13 wherein said variable birefringent material is selected from a group consisting an electro-optical material, an acousto-optical material, a magneto-optical material, and any combination thereof.

15. The polarimeter of claim 14 wherein said birefringent material comprises said electro-optical material selected from a group consisting of lithium niobate, a lanthanum modified lead zirconate titanate ceramnic, an electro-optic polymer, and any combination thereof.

16. The polarimeter of claim 15 wherein said electro-optical material is lithium niobate.

17. The polarimeter of claim 14 wherein said birefringent material has a form selected from a group consisting of a waveguide and a bulk crystal.

18. The polarimeter of claim 17 wherein said form is a waveguide integrated into a substrate.

19. The polarimeter of claim 18 wherein said polarizer is also integrated into said substrate.

20. The polarimeter of claim 19 wherein said polarizer is selected from a group consisting of a thin-film polarizer, a micro-optic polarizer, and a polarization diversity splitter.

21. The polarimeter of claim 13 wherein said polarizer is selected from a group consisting of a Glan-Thomson polarizer, a dichroic polarizer, a liquid crystal polarizer, a fiber optical polarizer, a polarization diversity splitter, and any combination thereof.

22. The polarimeter of claim 13 wherein said polarimeter further comprises:
a controller for said rotatable waveplate capable of causing a rotational angle of said waveplate to vary.

23. The polarimeter of claim 13 wherein said computing device is programmed to calculate Stokes parameters $S_0$, $S_1$, $S_2$, and $S_3$ substantially as follows:

$$S_0 = \frac{A-C}{\tan^2(\delta/2)};$$

$$S_1 = \frac{C}{\sin^2(\delta/2)};$$

$$S_2 = \frac{D}{\sin^2(\delta/2)}; \text{ and}$$

$$S_3 = \frac{B}{\sin(\delta)};$$

where $\delta$ is the true retardance of the rotatable waveplate.

24. A Stokes polarimeter comprising:
a rotatable waveplate receiving an optical signal and comprising a variable birefringent material;
a polarizer optically downstream from the rotatable waveplate receiving the optical signal from an output of the rotatable waveplate
a photodetector optically downstream from the polarizer receiving the optical signal from an output of the wolarizer and generating intensity measurements characterizing the optical signal; and,
a computing device performing Stokes calculations based on terms A, B, C, and D related to the intensity measurements;
wherein said computing device is programmed to calculate terms A, B, C, and D substantially as follows:

$$A = \frac{1}{8}\sum_{n=1}^{16} I(n\frac{\pi}{8});$$

$$B = \frac{1}{4}\sum_{n=1}^{16} I(n\frac{\pi}{8})\sin(n\frac{\pi}{4});$$

$$C = \frac{1}{4}\sum_{n=1}^{16} I(n\frac{\pi}{8})\cos(n\frac{\pi}{2}); \text{ and}$$

$$D = \frac{1}{4}\sum_{n=1}^{16} I(n\frac{\pi}{8})\sin(n\frac{\pi}{2});$$

where I is an intensity measurement.

* * * * *